United States Patent [19]

Keiser

[11] 3,936,582

[45] Feb. 3, 1976

[54] DIFFERENTIAL RELEASE COATED ARTICLES

[75] Inventor: LeRoy H. Keiser, Clarendon Hills, Ill.

[73] Assignee: Phillips Petroleum Company, Bartlesville, Okla.

[22] Filed: June 3, 1974

[21] Appl. No.: 475,978

[52] U.S. Cl. ............... 428/447; 428/452; 428/537; 427/209
[51] Int. Cl.² ...... B44D 1/10; B32B 7/06; C09J 7/04
[58] Field of Search............ 117/47 A, 47 R, 60, 68, 117/76 P, 155 R, 161 ZA; 156/289; 161/406; 428/447, 452, 537; 427/209, 326

[56] References Cited
UNITED STATES PATENTS

| | | | |
|---|---|---|---|
| 3,403,045 | 9/1968 | Erickson et al. | 117/68 |
| 3,419,508 | 12/1968 | Grenoble | 117/76 X |
| 3,432,333 | 3/1969 | Hurst | 117/68 |
| 3,503,782 | 3/1970 | Ayres | 117/45 |
| 3,628,996 | 12/1971 | Weber | 117/76 X |
| 3,749,593 | 7/1973 | Keiser | 117/68 |

*Primary Examiner*—Michael R. Lusignan

[57] ABSTRACT

This invention relates to low release value polyorganosiloxane coatings comprising a mixture of (a) polyorganosiloxanes having silicon-bonded hydroxyl groups on the ends of the molecule, and (b) polymethylhydrogensiloxanes having an average of at least 3 SiH groups per molecule, and high release value polyorganosiloxane coatings comprising a mixture of (a) and (b) together with polyorganosiloxanes containing triorganosiloxy end groups. The use of the improved high release value coating for coating one side of a differential release paper or laminate where the paper or laminate is stacked or rolled for storage so that there is contact with the opposite side of the differential release paper which is coated with the lower release value coating reduces the migration of high release value coating to the low value coating in contact thereby improving shelf life of the differential release paper.

10 Claims, No Drawings

DIFFERENTIAL RELEASE COATED ARTICLES

BACKGROUND OF THE INVENTION

This invention relates to release coatings for substrates. In one of its aspects this invention relates to improved low release value coatings comprising a mixture of (a) polyorganosiloxanes having silicon-bonded hydroxyl groups on the ends of the molecule, and (b) polymethylhydrogensiloxanes having an average of at least 3 SiH groups per molecule. In another aspect of the invention there is provided a high release value coating composition comprising a mixture of (a) and (b) plus a polyorganosiloxane containing triorganosiloxy end groups. In another of its aspects this invention relates to differential release papers or laminates coated on one side with a high release value polyorganosiloxane coating and on the opposite side with a lower release value of polyorganosiloxane coating. In still another of its aspects this invention relates to improving the shelf life of differential release papers or laminates by coating one side with a high release value of polyorganosiloxane coating and the opposite side with a lower release value of polyorganosiloxane coating.

In one of its concepts this invention relates to the prevention of migration of high release silicones from one surface of a differential release paper to a low release value silicone coated surface brought into contact with the high release value silicone coating. The migration is reduced by the method of curing the high release value silicones which provides a relatively more stable coating composition.

The invention concerns a differential release paper or laminate consisting of a substrate such as paper which can have been coated on one or both sides with a polymer such as polyethylene. The resulting laminated structure is then coated on one side with a silicone release agent after which the second side is coated with a silicone release agent designed to give a dissimilar release value from that of the first side.

Problems usually arise, however, in adequately curing each silicone overcoated and in the tendency of adjacent surfaces of stacks or rolls to transfer coating components between each other. When transfer occurs the release value of the higher value release agent is lessened so that the difference between the release value of the two sides of the differential release paper is lessened or, at worst, the values become about the same, so that the advantages of a differential release paper are nullified.

The laminates referred to in the invention are normally made at the rate of several hundred feet per minute and after coating with the silicone solutions are passed through ovens to remove solvent and at least initiate curing of the applied resins. The laminate is then usually wound into a roll and stored until ready for use. It is during this storage time that transfer between the adjacent sides can occur. Of course, sheets of an uncoated dissimilar material can be employed as spacer sheets to prevent contact between the rolled or stacked sheets to remedy the transfer, but this practice is time consuming and expensive.

I have found that by the use of a dual catalyst system in preparing the silicone release coating compositions of this invention for coating a substrate a release coating of improved stability is obtained.

It is therefore an object of this invention to provide a coating composition that can be used to produce a high release value coating on a substrate. It is another object of this invention to provide a method for producing a high release value coating on a substrate and the product of improved stability produced thereby. It is another object of this invention to provide a differential release paper or laminate of improved shelf life.

SUMMARY OF THE INVENTION

In accordance with the invention, there is provided a low release value coating composition comprising a mixture of (a) polyorganosiloxanes having silicon-bonded hydroxyl groups on the ends of the molecule and (b) polymethylhydrogensiloxanes having an average of at least 3 SiH groups per molecule.

Further, in accordance with the invention there is provided a high release value coating composition comprising a mixture of (a) polyorganosiloxanes having silicon-bonded hydroxyl groups on the ends of the molecule, (b) polymethylhydrogensiloxanes having an average of at least 3 SiH groups per molecule, and (c) polyorganosiloxanes which contain triorganosiloxy end groups and are resinous in nature due to their three dimensional, highly cross-linked structure.

Further, in accordance with the invention differential release papers or laminates are provided which are coated on one side with the high release value polyorganosiloxane coating composition according to the invention and on the opposite side with a lower release value polyorganosiloxane coating composition according to the invention.

In one specific embodiment of the invention, a substrate is coated on one side with a high release value polyorganosiloxane coating of this invention and on its other side with a polyorganosiloxane coating of lower release value of this invention, the curing reaction is initiated, and the coatings are allowed to cure to provide a differential release laminate of extended shelf life.

SUITABLE SUBSTRATES

Suitable substrates include paper, plastic films such as polyolefins, textile fabrics made from nylon, orlon, glass, etc. and metal sheets or foil such as aluminum foil and the like.

Paper is particularly preferred as a substrate, because of the wide variety of applications in which it can be used. Any kind of paper or paperboard can be used providing it has sufficient tensile strength to withstand the stresses encountered in conventional paper coating apparatus. Thus, suitable paper or paperboard can be made from wood, straw, bark, cotton, flax, corn stalks, bamboo, hemp and similar cellulosic materials prepared by such process as the soda, sulfite or sulfate (Kraft) process, the neutral sulfite cooking process, alkali-chlorine processes, nitric acid processes, semichemical processes and the like. Also, any of the treated, filled, sized or resinimpregnated papers and the like can be used. Although paper of any weight can be used providing it has adequate physical properties as the substrate, papers having weights in the range of 25 lbs. to 150 lbs. per ream are presently preferred.

Also included as substrates are those materials previously enumerated which have been coated on one or both sides with a thermoplastic film forming polymer. Any of the thermoplastic polymers known in the art which can be bonded to the above materials and to which a silicone release agent can be bonded are suitable for use in the practice of the invention. Polymers and copolymers, normally solid, of aliphatic 1-olefins containing from 2 to 8 carbon atoms are preferred as the film forming material however. Of these, polyethylene, polypropylene and copolymers of ethylene with propylene, 1-butene and 1-hexene are especially preferred.

DESCRIPTION OF THE SILICONES

The polyorganosiloxanes which can be used in the compositions for coating the low release side of the substrate consist essentially of 90 to 99 weight percent of a polymer having silicon-bonded hydroxyl groups on the ends of the molecule, said polymer having a viscosity of at least about 2,000 centistokes (cs.) at 25°C and said polymer being composed of polymer units of the formula $$R_nSiO_{4-n/2}$$

in which each R is selected from the group consisting of monovalent hydrocarbon radicals and n has an average value of 2 (siloxane 1) and 1 to 10 weight percent of a polymethylhydrogensiloxane having an average of at least 3 SiH groups per molecule (siloxane 2).

Siloxane (1) contains silicon-bonded hydroxyl radicals attached at the molecular chain ends and it is substantially a polydiorganosiloxane. It can contain small amounts of monoorganosiloxane units but it is preferably substantially free from triorganosiloxane units. The organic radicals (R) attached to the silicon atoms of siloxane (1) can be any combination of suitable monovalent hydrocarbon radicals such as alkyl, cycloalkyl, vinyl, allyl, aryl, alkaryl, and aralkyl. Preferably, each R is selected from the group consisting of alkyl radicals containing from 1 to 6 carbon atoms, and phenyl. Compositions wherein each R is methyl are presently more preferred.

Siloxane (1) can be a homopolymer or a copolymer containing two or more species of siloxane units. It can also be a mixture of homopolymers and/or copolymers. The siloxane (1) polymers can range in viscosity from about 2,000 cs. at 25°C upward to about 10,000,000 cs. or even more. The polymers can be thin liquids or non-flowing soluble gums. It is necessary that the degree of polymerization has not progressed to the point where the polymers are insoluble in organic solvents such as toluene, xylene, methyl ethyl ketone, carbon tetrachloride, and the like. In general, any organic solvent having a boiling point equal to or less than xylene can be used in the compositions used in the practice of the invention. The solvent serves as a convenient vehicle or carrier for uniform application to the substrate. Thus, higher boiling solvents can be used but require so much time for their removal that their use is not commercially practical. Various polyorganosiloxanes are commercially available in organic solvents in various per cent solids concentration.

Siloxane (2) is a polymethylhydrogensiloxane having an average of at least 3 SiH groups per molecule. It can have a linear, cyclic or branched structure and it can be either a homopolymer or a copolymer. The amount of siloxane (2) used ranges from 1 to 10 percent, more preferably 1 to 5 percent based on the weight of siloxane (1).

Examples of siloxane (2) are

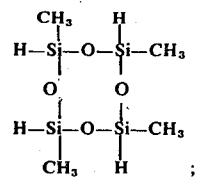

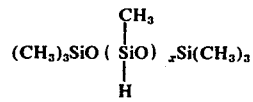

wherein x is 3 to 50;

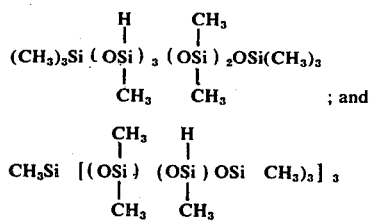

; and

CH₃Si [(OSi)(OSi)OSi CH₃)₃]₃ with CH₃ and H substituents

Siloxane (1) and siloxane (2) can be individually polymerized and subsequently mixed together to obtain the polyorganosiloxanes which are used in the low release coating compositions applied to the substrate.

The polymers used in coating the high release value side of the substrate, which polymeric compositions form the substance of this invention are similar to those used for the first side but which contain, in addition, sufficient silicone polymers to modify the release properties of the substrate coated with the composition. These polymers are polyorganosiloxanes which contain triorganosiloxy end groups and are resinous in nature due to their three-dimensional, highly crosslinked structure. The triorganosiloxy groups can have hdrocarbyl substituents such as alkyl, cycloalkyl, cycloalkenyl, vinyl, and allyl groups containing from 1 to 6 carbon atoms. Examples include methyl, ethyl, hexyl, cyclopentyl, cyclohexenyl and the like. Preferred triorganosiloxy end groups are trimethysiloxy or vinyldimethylsiloxy. These polymers can be prepared in a variety of ways known to the art. One method is to cohydrolyze a mixture of organochlorosilanes selected from the group consisting of SiCl₄
R'SiCl₃
R'R"SiCl₂
R'R"R'"SiCl wherein R', R", R'" are monovalent hydrocarbon radicals defined as above and may or may not be identical within any given monomer.

The product obtained from the cohydrolysis process will contain substantial terminal silanol groups. These terminal silanol groups are endblocked with a triorganosiloxy group to substantially reduce the silanol content to about zero in a secondary process step. For example, sufficient quantities of trimethylchlorosilane or vinyldimethylchlorosilane are added to the cohydrolysis product to supply the necessary terminal end groups. The endblocking step is desirable to obtain a more stable polymeric structure. The resulting resinous product is a mixture with a three dimensional crosslinked structure in which the monovalent hydrocarbon radical to Si ratio ranges from about 1.5:1 to about 3:1. The resinous product has a broad molecular weight distribution with a molecular weight in the range of about 2,000 to about 40,000 and it is soluble in organic solvents such as benzene, toluene, and the like.

The ratio of the triorganosiloxy endblocked polymer to the mixture of siloxane (1) and sibxane (2) ranges from about 0.01 to 1 to about 0.2 to 1 and more preferably from about 0.04 to 1 to about 0.1 to 1 by weight.

Prior to application of the low release value polyorganosiloxane coating compositions, a small functional amount of a suitable catalyst or curing agent is added to effect curing of the polyorganosiloxane. Suitable catalysts for this purpose include dibutyltin di(2-ethylhexoate), dibutyltin dilaurate, dibutyltin diacetate, tributyltin acetate, diethylenetriamine, triethylenetetramine, various lead salts such as lead naphthenate and lead octoate, zinc octoate, zinc stearate, iron octoate, various organic peroxides such as benzoyl peroxide, and others, as well as mixtures thereof. The amount of said curing agents or catalysts used is not critical and can be varied widely depending upon the curing temperature, the particular catalyst used, desired curing time, the particular silicone polymer, etc. Usually, the amount used will be from 1 to 10 weight percent of the silicone polymer.

The mixed polymer composition forming the high release value coating according to the invention requires a mixed catalyst consisting of the organometal salts previously described and an organic peroxide such as benzoyl peroxide, 2,4-dichlorobenzoyl peroxide and the like. Presently preferred for the organometal salts are the carboxylic acid salts of organotin compounds containing at least one carbon-tin bond such as dibutyltin di(2-ethylhexoate), dibutyltin dilaurate, dibutyltin diacetate, dibutyltin acetate, as well as mixtures thereof.

The polymeric compositions used in coating either side of the differential release laminate of this invention can be either filled or unfilled. Suitable fillers both organic and inorganic are set out in the above cited U.S. Pat. No. 3,432,333.

Mixing the coating compositions of this invention requires no special equipment or conditions. A catalyst is added to the polymer with both the polymer and the catalyst dissolved in a suitable solvent which may be the same solvent or compatible solvents. The catalyst solutions and the polymer solutions are thoroughly mixed by any convenient method and are then ready for application to the substrate. Suitable coating equipment is well known in the art.

Procedures for coating laminates are well known and follow the procedures set out below for overcoating a polyolefin coated substrate with a polyorganosiloxane: (1) prime or activate one side of the paper substrate; (2) extrusion coat said primed or activated surface with a coating of a polyolefin and provide either a matte or gloss finish; (3) activate said polyolefin coating; (4) apply a first thin coat of a polyorganosiloxane to said activated polyolefin coating; (5) heat in an oven to obtain an essentially dry film which is at least partially cured; (6) apply a second thin coating of a polyorganosiloxane over said first thin coating; (7) heat in an oven to obtain an essentially dry film which is at least partially cured; (8) age the thus coated and overcoated substrate at room temperature for a period of at least two days; (9) remoisten or prime the opposite side of said paper substrate with an aqueous priming agent; and (10) repeat said steps (2)–(8) for the opposite side of said substrate except for using a polyorganosiloxane having a different release value. By the process of this invention one side of the substrate will be coated with the stabilized high release value polyorganosiloxane of this invention. The polyorganosiloxanes are applied to the substrate surfaces in amounts, on a dry basis, preferably 0.06 to about 0.3 pounds per ream.

Curing of said polyorganosiloxane coating material can take place at room temperature depending upon the particular silicone material used and the particular curing agent or catalyst used in conjunction with said silicone material. However, for practical continuous operations the time required for curing at room temperature is too long. Most curing agents or catalysts are capable of promoting relatively rapid curing at moderately elevated temperatures. This temperature at which relatively rapid curing takes place is sometimes referred to as the curing initiating temperature even though curing will take place at room temperature. For the preferred polyorganosiloxanes described herein this temperatre is in the range of 180° to 250°F. Once curing has been initiated and maintained at an elevated temperature for a short period of time as described herein, the curing can then advantageously be allowed to proceed by aging at reduced temperatures, e.g., at room temperatures or moderately (25° to 50°F) above. As mentioned above, it is essential that said curing be effected without distorting the polyolefin coating under the polyorganosiloxane overcoating. Thus, the choice of temperature actually employed in the curing steps will depend upon a number of factors such as the type of polyolefin coating material used, the type of silicone overcoating material used, the curing catalyst used with said silicone material, and the rate at which the coated paper is passed through the heating zone. For example, polypropylene has a higher melting point than polyethylene; the temperature at which the silicone material cures is affected by the choice of curing catalyst; and the oven temperature will vary with the rate at which the paper is passed therethrough.

Ideally, it is desirable in said heating and curing steps to heat the silicone overcoating material and not heat the polyolefin coating material thereunder. However, as a practical matter, this is practically impossible to accomplish. In any event, it is desired to heat and cure the polyorganosiloxane overcoating material as rapidly as possible without heating the polyolefin coating thereunder sufficiently to cause distortion of said polyolefin coating. Thus, in the practice of the invention, it is preferred to increase the temperature of the silicone overcoated material the desired amount as rapidly as possible and then hold it at the increased temperature for a period of time sufficient to effect the desired amount of partial curing. Thus, in a preferred manner of practicing the invention, the coated and overcoated paper substrate is passed through a first and a second heating zone, in series. The temperature in said first heating zone will always be greater than the temperature in said second heating zone and will usually be within the range of from 250° to 560° F, preferably 325° to 375° F. The temperature in said second heating zone will usually be within the range of from 75° to 350°F., preferably within the range of from 225° to 275°F.

the following examples will serve to further illustrate the invention.

EXAMPLE I (Control)

One side of a bleached kraft paper, 53 pounds per ream, was primed in line at a rate of 300 linear feet per minute with 1.75 lbs/ream, wet basis, of a priming solution consisting essentially of about 1.0 weight percent polyethylene imine, about 98.6 weight percent water and about 0.4 weight percent sodium hexametaphosphate. The excess water was driven off the primed paper by heating same to a temperature within the range of 100° to 150°F. The thus primed paper was extrusion coated at a rate of 300 linear feet per minute on one side with 12 pounds per ream of a commercial polyethylene having a density of 0.915 g/cc and a melt index of 12. The reverse side of the paper was then primed, dried and extrusion coated at 300 linear feet per minute with 12 pounds per ream of said commercial polyethylene. The coated paper was rolled into a roll and aged at room temperature for 24 hours.

One side of the polyethylene coated paper was activated by treating it with a corona discharge from a Lepel spark generator set at about 1.2 watts per square foot per minute. The corona discharge-treated polyethylene coat was then silicone overcoated with a 14 weight percent solution in toluene of a commercially available silicone material consisting essentially of a 30 weight percent solution in xylene of a polyorganosiloxane mixture consisting of about 97 weight percent of a siloxane containing silicon-bonded hydroxyl radicals attached at the molecular chain ends having a viscosity of about 7,000,000 centistokes and 3 weight percent of a polymethylhydrogensiloxane having a viscosity of about 35 centistokes. Prior to applying said solution of copolymer, there was added thereto 4.7 weight percent of dibutyltin di(2-ethylhexoate) as a 50 weight percent solution in xylene based on the weight of said copolymer in said solution. Said overcoating solution was applied in 2 coats in an amount sufficient to give a total overcoat weight of 0.200 pound per ream, dry basis. This coating supplies low release values, i.e. 10–50 g/inch. Each silicone overcoating was partially cured by passing the web, at a rate of about 220 linear feet per minute through an over maintained at 300°F. The web was rolled into a roll and aged at room temperature for at least 10 days to complete the curing.

The reverse side of the web was then silicone overcoated in 2 coats with a 14 weight percent solution in toluene of a mixture of commercially available silicone polymers consisting of the same silicone polymers in xylene solution which was used on the reverse side admixed with about 7 weight percent of a polyorganosiloxane in xylene solution based on the weight of the mixture of commercially available silicones of a resinous, commercially available polyorganosiloxane endblocked with triorganosiloxy groups, i.e. trimethylsiloxy. Prior to applying said mixed solutions of silicones, there was added thereto 6 weight percent of dibutyltin di(2-ethylhexoate) as a 50 weight percent solution in xylene based on the weight of said polymers in said solution. Said overcoating solution was applied in an amount to give a total overcoat weight of 0.220 pounds per ream, dry basis. This coating supplies high release values, i.e. 100-200 g/inch. Each silicone coating was partially cured by passing the web, at a rate of about 260 linear feet per minute through an oven maintained at 300°F. The web was then rolled into a roll and aged at room temperature for at least 10 days to complete curing. Periodic testing of samples taken from the roll was done using a Keil tester to determine the release values of each side and to determine the useful life (shelf life) of the high release side. Release values are determined by stripping an agressive adhesive tape such as Johnson & Johnson Red Cross adhesive tape from the sample surface at a constant speed pull of 12 inches per minute. The useful life, in days, of the high release side is determined by noting the number of days in which the release value is 85 g/inch or more. The results are give below.

| | | |
|---|---|---|
| initial stable release value of high release coating | — | 110 g/inch |
| initial stable release value of low release coating | — | 30 g/inch |
| useful life of high release coating | — | 21 days |

EXAMPLE II (Control)

A bleached kraft paper, 53 pounds per ream, was primed, dried and coated on both sides with the same priming solution and the same polyethylene in the same manner as in Example I.

One side of the polyethylene coated web was corona treated in the same manner as in Example I and overcoated in 2 coats with the same high release silicone formulation used in Example I to give a total overcoat weight of 0.215 pounds per ream, dry basis. The silicone coating was partially cured by passing the web at a rate of about 250 linear feet per minute through an oven maintained at 300°F. The web was then rolled into a roll and aged at room temperature for at least 10 days to complete curing. Periodic testing of samples taken from the roll was done as before. The results are given below.

| | | |
|---|---|---|
| initial stable release value of high release coating | — | 100 g/inch |
| useful life of high release coating | — | >207 days |

EXAMPLE III (Invention)

A bleached kraft paper, 53 pounds per ream, was primed, dried and coated on both sides with the same priming solution and the same polyethylene in the same manner as in Example I.

One side of the polyethylene coated web was corona treated, overcoated as before with the same low release silicone formulation and same amount of catalyst, passed through an oven maintained at 300°F at the same linear speed, and aged as in Example I. The total coating weight was determined to be 0.200 pounds per ream, dry basis.

The other side of the polyethylene coated web was overcoated as before with the same high release silicone formulation as in Example I except that added thereto was a mixed catalyst consisting of 6 weight percent dibutyltin di(2-ethylhexoate) in a 50 weight percent solution of xylene and 5 weight percent of 2,4-dichlorobenzoyl peroxide as a 50 weight percent dispersion of dibutyl phthalate to give a total overcoat weight of 0.260 pounds per ream, dry basis. The silicone coating was partially cured by passing the web at a rate of about 220 linear feet per minute through an oven maintained at 300°F. The web was then rolled into a roll and aged at room temperature at least 10 days to complete curing. Periodic testing of samples taken from the roll was done as before. The results are given below.

| | |
|---|---|
| initial stable release value of high release coating | — 125 g/inch |
| initial stable release value of low release coating | — 20 g/inch |
| useful life of high release coating | — 103 days |

EXAMPLE IV (Invention, Repeat Run)

A bleached kraft paper, 53 pounds per ream, was primed, dried and coated on both sides with the same priming solution and the same polyethylene in the same manner as in Example I.

The polyethylene coated web was treated using the same process conditions as in Example III. Samples taken from the roll were tested as before. The results are given below.

| | |
|---|---|
| initial stable release value of high release coating | — 135 g/inch |
| initial stable release value of low release coating | — 15 g/inch |
| useful life of high release coating | — 97 days |

EXAMPLE V (Invention)

A bleached kraft paper, 53 pounds per ream, was primed, dried and coated on both sides with the same priming solution and the same polyethylene in the same manner as in Example I.

Each side of the polyethylene coated web was treated as in Example III with the exception that the coating weight (1 coat applied) on the high release side was 0.107 pounds per ream dry basis, or about one-half that of Example III. Samples taken from the roll were tested as before. The results are given below.

| | |
|---|---|
| initial stable release value of high release coating | — 135 g/inch |
| initial stable release value of low release coating | — 15 g/inch |
| useful life of high release coating | — 150 days |

The results show that differential release paper made conventionally as in Example I has a useful shelf life of only 21 days when stored in roll form. The high release and low release sides are in contact.

Example II shows that a high release coating of silicone when wound up against a non-silicone coat (polyethylene in this example) does not lose its release value.

The invention runs, Examples III to V, clearly show that the useful shelf life of differential release paper stored in roll form so that the high and low release sides are in contact can be substantially increased by practicing the invention. Addition of an organic peroxide catalyst to the mixed silicones containing the organic metal salt is the key. It apparently locks the silicone additive responsible for increasing the release value of low release silicones into the low release silicone structure thus reducing migration of the elusive silicone additive from one coating to another.

Reasonable variation and modification are possible within the scope of the foregoing disclosure and the appended claims of the invention the essence of which is that there has been provided a coating composition comprised of a silicone release agent and suitable curing agents such that the resulting coating applied to a substrate has increased stability to the migration of the silicone to an adjacent surface coated with a silicone with a lesser release value.

I claim:

1. A differential release coated article comprising a substrate coated on one side with
   I. a low release value cured polyorganosiloxane coating comprising a mixture of
      a. a polyorganosiloxane having silicon-bonded hydroxyl groups on the ends of the molecule,
      b. a polymethylhydrogensiloxane having an average of at least three SiH groups per molecule and
      c. a functional amount sufficient to effect curing of said polyorganosiloxane of a carboxylic acid salt of an organic metallic compound selected from lead, zinc, iron or tin; and
   coated on the opposite side with
   II. a high release cured polyorganosiloxane coating comprising a mixture of
      d. a polyorganosiloxane having silicon-bonded hydroxyl groups on the ends of the molecule,
      e. a polymethylhydrogensiloxane having an average of at least three SiH groups per molecule,
      f. a three-dimensional highly cross-linked polyorganosiloxane containing triorganosiloxy end groups in which the ratio of the monovalent hydrocarbon radicals to $SiO_2$ units ranges from about 1.5:1 to about 3:1, and
      g. a curing catalyst mixture comprising a functional amount sufficient to effect curing of said polyorganosiloxane of a carboxylic acid salt of an organometallic compound selected from lead, zinc, iron or tin and an organic peroxide.

2. A coated article according to claim 1 wherein said low release value polyorganosiloxane coating comprises a mixture of
   a. 90 to 99 weight percent of a polyorganosiloxane having silicon-bonded hydroxyl groups on the ends of the molecule, said polymer having a viscosity of at least about 2,000 centistokes (cs) at 25°C and said polymer being composed of polymer units of the formula $R_nSiO_{4-n/2}$ in which each R is selected from the group consisting of monovalent hydrocarbon radicals and $n$ has an average value of 2, and
   b. 1 to 10 weight percent of a polymethylhydrogensiloxane having an average of at least three SiH groups per molecule.

3. A coated article according to claim 1 wherein the high release value polyorganosiloxane coating comprises a mixture of
   d. 90 to 99 weight percent of a polyorganosiloxane having silicon-bonded hydroxyl groups on the ends of the molecule, said polymer having a viscosity of at least about 2,000 centistokes (cs) at 25°C and said polymer being composed of polymer units of the formula $R_nSiO_{4-n/2}$ in which each R is selected from the group consisting of monovalent hydrocarbon radicals and $n$ has an average value of 2,
   e. 1 to 10 weight percent of a polymethylhydrogensiloxane having an average of at least three SiH groups per molecule, and f. a polyorganosiloxane which contains triorganosiloxy end groups and which has a molecular weight in the range of about 2,000 to about 40,000 and is resinous in nature due to its three-dimensional, highly cross-linked structure, the ratio of (f) to the mixture of (d) and (e) ranging from about 0.01 to 1 to about 0.2 to 1 by weight.

4. A coated article according to claim 1 wherein the low release value polyorganosiloxane coating contains a functional curing amount of a carboxylic acid salt of an organometallic compound selected from lead, zinc, iron and tin, and the high release polyorganosiloxane coating contains as a curing agent a mixture of a carboxylic acid salt of an organometallic compound selected from lead, zinc, iron or tin in combination with an organic peroxide.

5. A differential release coated article according to claim 1 wherein at least one of coating (I) or coating (II) contains a filler material.

6. A differential release coated article according to claim 1 wherein the substrate is a fibrous material coated on at least one side with a polyolefin.

7. A differential release coated article according to claim 6 wherein said polyolefin has been subjected to a surface treatment to activate said polyolefin coating prior to application of the polyorganosiloxane coatings.

8. A coated article according to claim 1 in which the low release value polyorganosiloxane coating (I) contains organotin as the curing agent and the high release value polyorganosiloxane coating (II) contains organotin and a peroxide as curing agent.

9. A coated article according to claim 8 wherein the organotin used as the curing agent in each of the coatings (I) and (II) is dibutyltin di(2-ethylhexoate) and the peroxide in the high release coating (II) is 2,4-dichlorobenzoyl peroxide.

10. A coated article according to claim 3 wherein the low release value polyorganosiloxane coating comprises a mixture of
  a. 90 to 99 weight percent of a polyorganosiloxane having silicon-bonded hydroxyl groups on the ends of the molecule, said polymer having a viscosity of at least about 2,000 centistokes (cs) at 25°C and said polymer being composed of polymer units of the formula
  $R_nSiO_{4-n/2}$
in which each R is selected from the group consisting of monovalent hydrocarbon radicals and n has an average value of 2,
  b. 1 to 10 weight percent of a polymethylhydrogensiloxane having an average of at least three SiH groups per molecule, and
  c. a functional amount sufficient to effect curing of said polyorganosiloxane of a carboxylic acid salt of an organic metallic compound selected from lead, zinc, iron, or tin.

* * * * *